(12) United States Patent
Gao et al.

(10) Patent No.: US 12,294,724 B2
(45) Date of Patent: May 6, 2025

(54) VIDEO DECODING METHOD AND APPARATUS, VIDEO ENCODING METHOD AND APPARATUS, STORAGE MEDIUM, AND ELECTRONIC DEVICE

(71) Applicant: Tencent Technology (Shenzhen) Company Limited, Shenzhen (CN)

(72) Inventors: Xinwei Gao, Shenzhen (CN); Weiran Li, Shenzhen (CN); Chenchen Gu, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 132 days.

(21) Appl. No.: 17/469,710

(22) Filed: Sep. 8, 2021

(65) Prior Publication Data

US 2021/0409729 A1    Dec. 30, 2021

Related U.S. Application Data

(63) Continuation of application No. PCT/CN2020/116664, filed on Sep. 22, 2020.

(30) Foreign Application Priority Data

Sep. 27, 2019 (CN) .......................... 201910927111.X

(51) Int. Cl.
*H04N 19/167* (2014.01)
*H04N 19/119* (2014.01)
(Continued)

(52) U.S. Cl.
CPC ......... *H04N 19/167* (2014.11); *H04N 19/119* (2014.11); *H04N 19/176* (2014.11); *H04N 19/59* (2014.11); *H04N 19/70* (2014.11)

(58) Field of Classification Search
CPC .. H04N 19/176; H04N 19/172; H04N 19/117; H04N 19/80; H04N 19/167;
(Continued)

(56) References Cited

U.S. PATENT DOCUMENTS 6,292,713 B1 * 9/2001 Jouppi ................... G06F 3/011
    715/733
7,965,902 B1 * 6/2011 Zelinka .................. G06F 16/51
    382/284
(Continued)

FOREIGN PATENT DOCUMENTS

CN    101282479 A  * 10/2008
CN    104105006 A    10/2014
(Continued)

OTHER PUBLICATIONS

Tencent Technology, WO, PCT/CN2020/116664, Dec. 30, 2020, 5 pgs.
(Continued)

*Primary Examiner* — Daniel Chang
(74) *Attorney, Agent, or Firm* — Morgan, Lewis & Bockius LLP

(57) ABSTRACT

A video decoding method includes obtaining a current video frame and determining a region of interest (ROI) of the current video frame. The method also includes decoding the ROI by using a first resolution, and decoding at least other regions of the current video frame than the ROI by using second resolutions, the first resolution being higher than the second resolution.

20 Claims, 6 Drawing Sheets

(51) Int. Cl.
  *H04N 19/176* (2014.01)
  *H04N 19/59* (2014.01)
  *H04N 19/70* (2014.01)

(58) Field of Classification Search
  CPC .... H04N 19/17; H04N 7/0117; H04N 19/174; H04N 19/33; H04N 19/86
  See application file for complete search history.

(56) References Cited

U.S. PATENT DOCUMENTS

| | | | | |
|---|---|---|---|---|
| 8,264,524 | B1* | 9/2012 | Davey | H04N 23/698 348/222.1 |
| 8,724,694 | B2* | 5/2014 | Jia | H04N 19/44 375/242 |
| 8,761,538 | B2* | 6/2014 | Pereira | H04N 19/17 382/268 |
| 8,780,987 | B1* | 7/2014 | Jia | H04N 19/132 375/240.13 |
| 8,867,605 | B2* | 10/2014 | Jia | H04N 19/86 375/240 |
| 9,179,166 | B2* | 11/2015 | Vaduganathan | H04N 19/42 |
| 9,210,420 | B1* | 12/2015 | Jia | H04N 19/593 |
| 9,773,187 | B2* | 9/2017 | Drichel | G06V 30/1475 |
| 10,643,307 | B2* | 5/2020 | Chen | G06T 3/4046 |
| 11,284,124 | B2* | 3/2022 | D'Acunto | H04N 21/26258 |
| 2003/0007561 | A1 | 1/2003 | Kajiwara | |
| 2005/0024487 | A1* | 2/2005 | Chen | H04N 19/156 375/E7.146 |
| 2006/0056056 | A1* | 3/2006 | Ahiska | G08B 13/19643 359/690 |
| 2006/0256867 | A1* | 11/2006 | Turaga | H04N 19/577 375/E7.026 |
| 2007/0216763 | A1* | 9/2007 | Rossholm | H04N 19/182 375/E7.193 |
| 2008/0129844 | A1* | 6/2008 | Cusack | H04N 23/80 348/241 |
| 2008/0291262 | A1* | 11/2008 | Choi | H04N 7/148 348/14.02 |
| 2009/0141814 | A1* | 6/2009 | Yin | H04N 19/80 375/E7.193 |
| 2010/0098162 | A1* | 4/2010 | Lu | H04N 19/124 375/E7.146 |
| 2010/0128788 | A1* | 5/2010 | Moccagatta | H04N 19/61 375/E7.243 |
| 2011/0051814 | A1* | 3/2011 | Pai M.M | H04N 19/63 382/248 |
| 2012/0170659 | A1* | 7/2012 | Chaudhury | H04N 19/36 375/E7.123 |
| 2012/0177121 | A1* | 7/2012 | Tripathi | H04N 19/154 375/E7.243 |
| 2012/0215095 | A1* | 8/2012 | Av-Shalom | A61B 6/469 378/98.9 |
| 2012/0314952 | A1* | 12/2012 | Liu | H04N 19/159 382/173 |
| 2013/0051478 | A1 | 2/2013 | Wu et al. | |
| 2013/0101035 | A1* | 4/2013 | Wang | H04N 19/174 375/E7.243 |
| 2013/0107973 | A1* | 5/2013 | Wang | H04N 19/82 375/E7.193 |
| 2014/0046185 | A1* | 2/2014 | Mo | A61B 8/467 600/443 |
| 2014/0059166 | A1* | 2/2014 | Mann | H04N 21/234381 709/217 |
| 2014/0063031 | A1* | 3/2014 | Brasnett | G06T 1/60 345/536 |
| 2014/0079126 | A1* | 3/2014 | Ye | H04N 19/593 375/240.16 |
| 2014/0092963 | A1* | 4/2014 | Wang | H04N 19/70 375/240.12 |
| 2014/0136686 | A1* | 5/2014 | Tsai | H04L 43/08 709/224 |
| 2014/0301464 | A1* | 10/2014 | Wu | H04N 19/105 375/240.15 |
| 2014/0307775 | A1* | 10/2014 | Ouedraogo | H04N 19/159 375/240.02 |
| 2014/0307972 | A1* | 10/2014 | Mizuno | G06T 5/20 382/195 |
| 2015/0023407 | A1* | 1/2015 | Sato | H04N 19/17 375/240.02 |
| 2015/0181168 | A1* | 6/2015 | Pahalawatta | H04N 19/124 348/14.12 |
| 2015/0201197 | A1 | 7/2015 | Marlatt et al. | |
| 2015/0208070 | A1* | 7/2015 | Verzijp | H04N 19/172 375/240.02 |
| 2015/0228085 | A1* | 8/2015 | Komiya | H04N 23/683 382/107 |
| 2016/0021380 | A1 | 1/2016 | Li et al. | |
| 2016/0212423 | A1* | 7/2016 | Aharon | H04N 19/167 |
| 2016/0350569 | A1* | 12/2016 | Gagliano | G06K 7/10821 |
| 2017/0041605 | A1* | 2/2017 | Watanabe | H04N 19/167 |
| 2017/0127074 | A1 | 5/2017 | Wu et al. | |
| 2017/0132769 | A1* | 5/2017 | Barron | G06T 3/4076 |
| 2017/0142424 | A1* | 5/2017 | Jun | H04N 19/184 |
| 2017/0150067 | A1* | 5/2017 | Han | H04N 23/45 |
| 2017/0359596 | A1* | 12/2017 | Kim | H04N 19/132 |
| 2018/0091764 | A1* | 3/2018 | Aharon | H04N 7/0102 |
| 2018/0109806 | A1* | 4/2018 | Zhou | H04N 19/70 |
| 2018/0137119 | A1* | 5/2018 | Li | H04N 23/63 |
| 2018/0167634 | A1* | 6/2018 | Salmimaa | H04N 19/167 |
| 2018/0192058 | A1* | 7/2018 | Chen | G06T 3/403 |
| 2018/0302556 | A1* | 10/2018 | Baran | H04N 19/167 |
| 2019/0098347 | A1* | 3/2019 | Chaugule | H04N 21/6587 |
| 2019/0122642 | A1* | 4/2019 | Morein | H04N 13/383 |
| 2019/0138192 | A1* | 5/2019 | Rao | A61B 6/469 |
| 2019/0318709 | A1* | 10/2019 | Wicks | G06T 15/005 |
| 2020/0134824 | A1* | 4/2020 | Adiga | G06T 7/12 |
| 2020/0234407 | A1* | 7/2020 | Ollila | G06T 3/4053 |
| 2021/0027700 | A1* | 1/2021 | Chun | G09F 9/301 |
| 2021/0383534 | A1* | 12/2021 | Tadross | G06V 10/454 |
| 2021/0409729 | A1* | 12/2021 | Gao | H04N 19/17 |
| 2022/0319071 | A1* | 10/2022 | Grass | G06T 11/008 |
| 2022/0349998 | A1* | 11/2022 | Halbritter | G01S 7/499 |
| 2023/0336816 | A1* | 10/2023 | Ryou | H04N 19/59 |

FOREIGN PATENT DOCUMENTS

| | | |
|---|---|---|
| CN | 104205815 A | 12/2014 |
| CN | 106031177 A | 10/2016 |
| CN | 108463765 A | 8/2018 |
| CN | 108476324 A | 8/2018 |
| CN | 108737724 A | 11/2018 |
| CN | 108833923 A | 11/2018 |
| CN | 109417642 A | 3/2019 |
| CN | 109716769 A | 5/2019 |
| CN | 110087081 A | 8/2019 |
| CN | 110572579 A | 12/2019 |
| CN | 110636294 A | 12/2019 |
| WO | WO 2018045108 A1 | 3/2018 |

OTHER PUBLICATIONS

Tencent Technology, IPRP, PCT/CN2020/116664, Mar. 15, 2022, 6 pgs.
Tencent Technology, ISR, PCT/CN2020/116664, Dec. 30, 2020, 4 pgs.

* cited by examiner

VIDEO DECODING METHOD AND APPARATUS, VIDEO ENCODING METHOD AND APPARATUS, STORAGE MEDIUM, AND ELECTRONIC DEVICE

CROSS-REFERENCE TO RELATED APPLICATIONS

This application is a continuation application of PCT Patent Application No. PCT/CN2020/116664, entitled "VIDEO DECODING METHOD AND APPARATUS, VIDEO ENCODING METHOD AND APPARATUS, STORAGE MEDIUM, AND ELECTRONIC DEVICE" filed on Sep. 22, 2020, which claims priority to Chinese Patent Application No. 201910927111.X, entitled "VIDEO DECODING METHOD AND APPARATUS, AND VIDEO ENCODING METHOD AND APPARATUS" filed with the China National Intellectual Property Administration on Sep. 27, 2019, all of which are incorporated herein by reference in their entirety.

This application is related to U.S. application Ser. No. 17/469,716, entitled "VIDEO ENCODING METHOD AND APPARATUS, VIDEO DECODING METHOD AND APPARATUS, ELECTRONIC DEVICE AND READABLE STORAGE MEDIUM" filed on Sep. 8, 2021, which is incorporated by reference in its entirety.

This application is related to U.S. application Ser. No. 17/469,721, entitled "VIDEO ENCODING METHOD, VIDEO DECODING METHOD, AND RELATED APPARATUSES" filed on Sep. 8, 2021, which is incorporated by reference in its entirety.

This application is related to U.S. application Ser. No. 17/469,729, entitled "VIDEO DECODING METHOD AND APPARATUS, VIDEO ENCODING METHOD AND APPARATUS, STORAGE MEDIUM, AND ELECTRONIC DEVICE" filed on Sep. 8, 2021, which is incorporated by reference in its entirety.

FIELD OF THE TECHNOLOGY

This application relates to the field of computers, and specifically, to a video decoding method and apparatus, a video encoding method and apparatus, a storage medium, and an electronic device.

BACKGROUND OF THE DISCLOSURE

In the existing video encoding process, as shown in FIG. 1, if different blocks in a frame of a video are encoded with a high resolution, when a transmission bandwidth is relatively small (for example, less than a bandwidth threshold Th shown in FIG. 1), a peak signal-to-noise ratio (PSNR) 1 corresponding to a case in which different blocks in a frame of the video are encoded with a high resolution is lower than a PSNR 2 corresponding to a case in which different blocks in a frame of the video are encoded with a low resolution. In other words, when the transmission bandwidth is relatively small, the PSNR 1 when a high resolution is used for encoding is relatively small, and distortion is relatively large.

Similarly, if different blocks in a frame of the video are encoded with a low resolution, when the transmission bandwidth is relatively large (for example, greater than the bandwidth threshold Th shown in FIG. 1), a PSNR 3 corresponding to the case in which different blocks in a frame of the video are encoded with a low resolution is lower than a PSNR 4 corresponding to a case in which different blocks in a frame of the video are encoded with a high resolution. In other words, when the transmission bandwidth is relatively large, the PSNR 3 when a low resolution is used for encoding is relatively small, and distortion is relatively large.

In addition, for different types of videos, different frames in the same video, or different blocks in the same frame, the foregoing intersection D moves, which increases the difficulty of choosing which resolution to encode frames in a video in the related art.

For the foregoing problem, no effective solution has been provided yet.

SUMMARY

A video decoding method is performed at an electronic device, the method including:
  obtaining a current video frame;
  determining a region of interest (ROI) of the current video frame; and
  decoding the ROI by using a first resolution, and decoding at least other regions of the current video frame than the ROI by using second resolutions, the first resolution being higher than the second resolutions.

A video encoding method is performed at an electronic device, the method including:
  obtaining a current video frame;
  determining a ROI in the current video frame; and
  encoding the ROI by using a first resolution, and encoding at least other regions of the current video frame than the ROI by using second resolutions, the first resolution being higher than the second resolutions.

One or more non-transitory computer-readable storage media storing computer-readable instructions are provided, the computer-readable instructions, when executed by one or more processors, causing the one or more processors to perform the following steps:
  obtaining a current video frame;
  determining a ROI of the current video frame; and
  decoding the ROI by using a first resolution, and decoding at least other regions of the current video frame than the ROI by using second resolutions, the first resolution being higher than the second resolutions.

An electronic device is provided, including a memory and one or more processors, the memory storing computer-readable instructions, and the computer-readable instructions, when executed by the one or more processors, causing the one or more processors to perform the following steps:
  obtaining a current video frame;
  determining a ROI of the current video frame; and
  decoding the ROI by using a first resolution, and decoding at least other regions of the current video frame than the ROI by using second resolutions, the first resolution being higher than the second resolutions.

One or more non-transitory computer-readable storage media store computer-readable instructions are provided, the computer-readable instructions, when executed by one or more processors, causing the one or more processors to perform the following steps:
  obtaining a current video frame;
  determining a ROI in the current video frame; and
  encoding the ROI by using a first resolution, and encoding at least other regions of the current video frame than the ROI by using second resolutions, the first resolution being higher than the second resolutions.

An electronic device is provided, including a memory and one or more processors, the memory storing computer-readable instructions, and the computer-readable instructions, when executed by the one or more processors, causing the one or more processors to perform the following steps:

obtaining a current video frame;

determining a ROI in the current video frame; and encoding the ROI by using a first resolution, and encoding at least other regions of the current video frame than the ROI by using second resolutions, the first resolution being higher than the second resolutions.

BRIEF DESCRIPTION OF THE DRAWINGS

To describe technical solutions in embodiments of this application more clearly, the following briefly introduces the accompanying drawings required for describing the embodiments. Apparently, the accompanying drawings in the following description show only some embodiments of this application, and a person of ordinary skill in the art may still derive other drawings from these accompanying drawings without creative efforts.

DESCRIPTION OF EMBODIMENTS

In order to make a person skilled in the art better understand the solutions of this application, the following clearly and completely describes the technical solutions in the embodiments of this application with reference to the accompanying drawings in the embodiments of this application. Apparently, the described embodiments are only some of the embodiments of this application rather than all of the embodiments. All other embodiments obtained by a person of ordinary skill in the art based on the embodiments of this application without creative efforts shall fall within the protection scope of this application.

In this specification, the claims, and the accompanying drawings of this application, the terms "first", "second", and so on are intended to distinguish similar objects but do not necessarily indicate a specific order or sequence. It is to be understood that the data termed in such a way are interchangeable in appropriate circumstances, so that the embodiments of this application described herein can be implemented in orders other than the order illustrated or described herein. Moreover, the terms "include", "contain" and any other variants mean to cover the non-exclusive inclusion, for example, a process, method, system, product, or device that includes a list of steps or units is not necessarily limited to those expressly listed steps or units, but may include other steps or units not expressly listed or inherent to such a process, method, system, product, or device.

Figure 2:
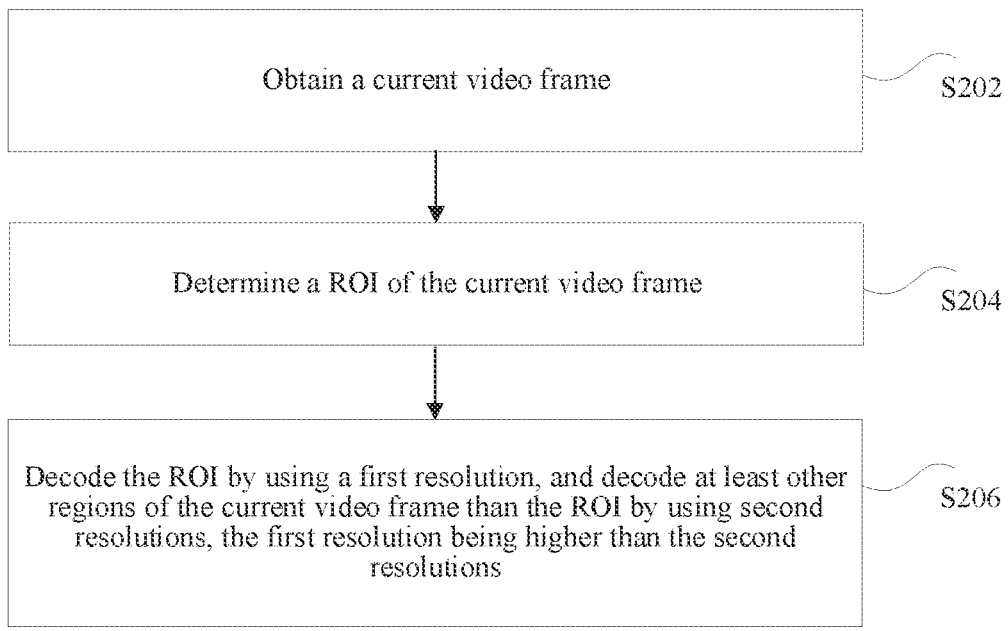
FIG. 2 is a schematic diagram of an exemplary video decoding method according to an embodiment of this application.

According to an aspect of the embodiments of this application, a video decoding method is provided. As shown in FIG. 2, the method includes:

S202. Obtain a current video frame to be decoded.

S204. Determine a ROI of the current video frame.

S206. Decode the ROI by using a first resolution, and decode at least other regions of the current video frame than the ROI by using second resolutions, the first resolution being higher than the second resolutions. In some embodiments, the first resolution and the second resolutions are determined according to a transmission bandwidth of a video stream including the current video frame from a source (e.g., a video server 302) to a destination (e.g., a client terminal 304), e.g., by comparing the transmission bandwidth with a preset bandwidth threshold.

Figure 3:
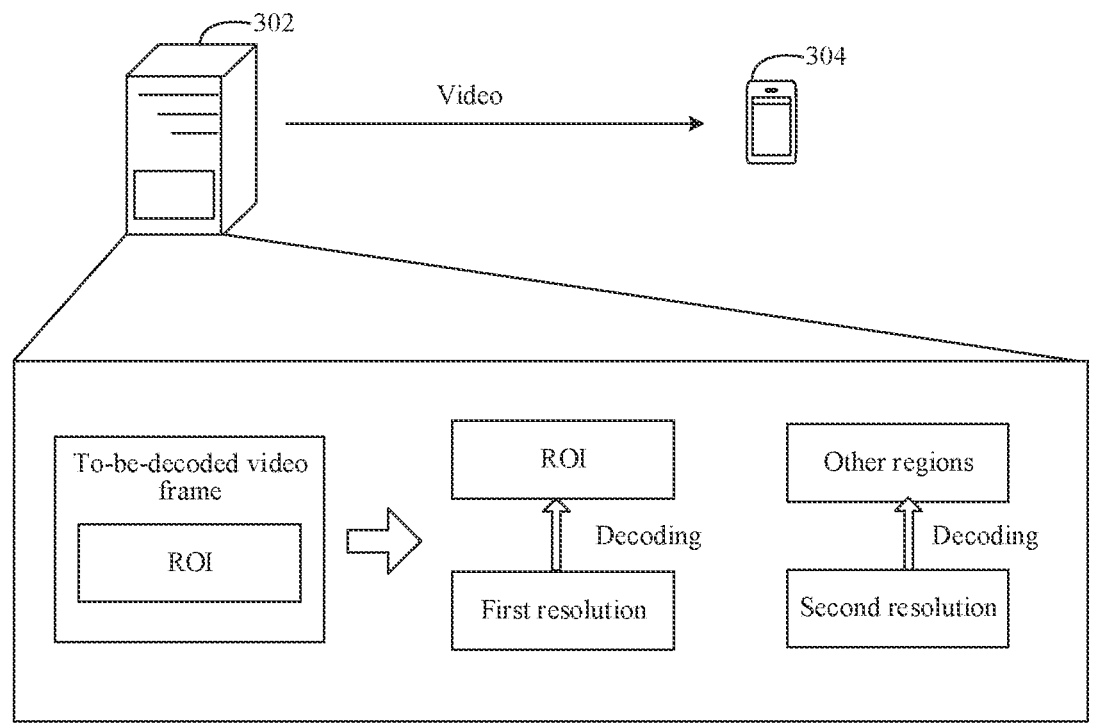
FIG. 3 is a schematic diagram of an application environment of an exemplary video decoding method according to an embodiment of this application.

In some embodiments, the video decoding method may be applied to a hardware environment formed by a server 302 and a client 304 shown in FIG. 3. As shown in FIG. 3, the server 302 obtains a current video frame; determines a ROI of the current video frame; and decodes the ROI by using a first resolution, and decodes at least other regions of the current video frame than the ROI by using second resolutions, the first resolution being higher than the second resolutions. The server 302 sends the decoded video to the client 304 for playing.

In some embodiments, the video decoding method may be applied to, but not limited to, a scenario of audio and video processing. For example, a client A and a client B make a video call. The client A and the client B separately acquire video images, encode the acquired video images, and send the encoded video to the other party. The other party decodes the received video and plays the decoded video.

In some embodiments, the video decoding method may be further applied to, but not limited to, scenarios such as the playback of video files and live video streaming.

The foregoing client may be, but is not limited to, various applications, for example, an on-line education application, an instant messaging application, a community space application, a game application, a shopping application, a browser application, a financial application, a multimedia application, and a live broadcast application. Specifically, the client may be applied to, but not limited to, a scenario in which audio and video are processed in the foregoing instant messaging application, or may be applied to, but not limited to, a scenario in which audio and video are processed in the foregoing multimedia application, to avoid large fluctuations in a PSNR of video encoding and decoding. This is merely an example and is not limited in this embodiment.

In some embodiments, the current video frame includes a ROI and a non-ROI, that is, the other regions in the current video frame than the ROI may be referred to as non-ROIs. The ROI is decoded by using a relatively high resolution to ensure the picture quality of the ROI, and the other regions in the current video frame than the ROI are decoded by using a relatively low resolution to ensure the stability of the PSNR.

In some embodiments, in terms of the ROI, in machine vision and image processing, a region that needs to be processed and that is outlined in a box, a circle, an ellipse, an irregular polygon, or the like from a processed image is referred to as the ROI. Various operators and functions may be used on machine vision software such as Halcon, OpenCV, and MATLAB to obtain the ROI.

In the field of image processing, a ROI is an image region selected from an image, and this region is the focus of image analysis. The region is delineated for further processing. The ROI is used to delineate a target expected to be read, which can reduce processing time and increase accuracy.

Figure 4:
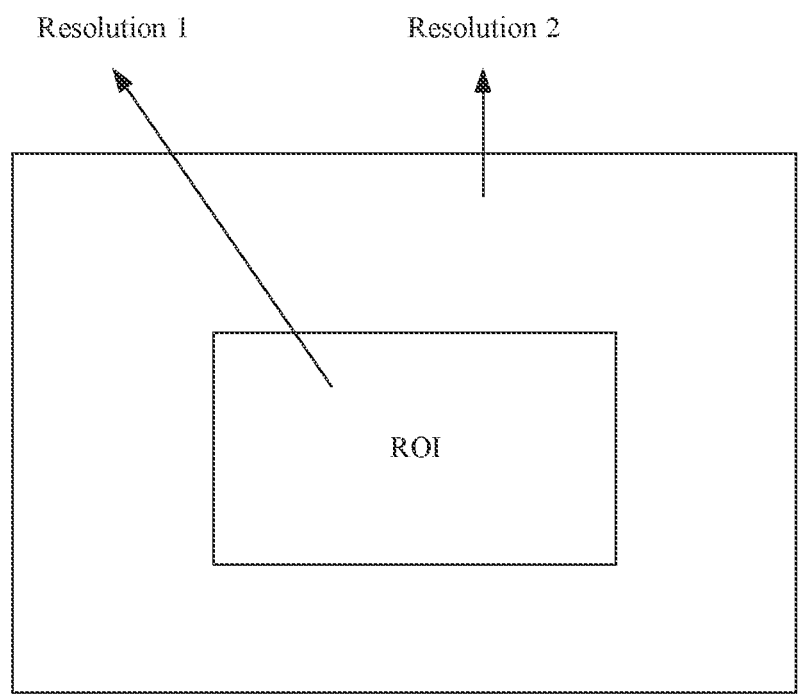
FIG. 4 is a schematic diagram of an exemplary video decoding method according to an embodiment of this application.

In an optional implementation, as shown in FIG. 4, a current video frame is obtained; a ROI of the current video frame is determined; and the ROI is decoded by using a resolution 1, and at least other regions (non-ROIs) of the current video frame than the ROI are decoded by using resolutions 2, the resolution 1 being higher than the resolutions 2.

As can be seen, through the foregoing steps, different regions in a frame of a video are adaptively encoded by using corresponding resolutions. In this way, regardless of whether a transmission bandwidth is relatively small or whether the transmission bandwidth is relatively large, the corresponding PSNR is relatively large, and the distortion is relatively small, thereby ensuring that the PSNR can change within a small range. In addition, the PSNR is relatively large, thereby achieving a technical effect of avoiding large fluctuations in the PSNR of video encoding and decoding, and further resolving the technical problem of large fluctuations in the PSNR due to the use of the same resolution for video encoding and decoding in the related art.

In an implementation, the decoding the ROI by using a first resolution, and decoding at least other regions of the current video frame than the ROI by using second resolutions includes:

decoding a target video block that has an overlapping part with the ROI among a plurality of video blocks by using the first resolution, and decoding other video blocks in the plurality of video blocks than the target video block by using the second resolutions, the current video frame being divided into the plurality of video blocks.

In some embodiments, for the current video frame, a region at a center of the video frame may be determined as the ROI; or a major person or thing region appearing in the video frame may be determined as the ROI; or a picture region in which motion exists in the video frame may be determined as the ROI.

In an implementation, the decoding other video blocks in the plurality of video blocks than the target video block by using the second resolutions includes:

decoding the other video blocks in the plurality of video blocks than the target video block by using a plurality of resolutions, the second resolutions including the plurality of resolutions.

In some embodiments, resolutions used when video blocks in the non-ROI are decoded may be the same or different. When different resolutions are used for decoding, the resolutions used may be determined according to distances between the video blocks and the center of the ROI. For example, a smaller resolution is used for a longer distance, and a high resolution is used for a shorter distance.

In an implementation, the decoding the ROI in the current video frame by using a first resolution, and decoding other regions of the current video frame than the ROI by using second resolutions includes:

obtaining a syntax element from each piece of to-be-decoded data in to-be-decoded data of a plurality of video blocks, a syntax element corresponding to a target video block in the plurality of video blocks that has an overlapping part with the ROI indicating that a resolution used to decode the target video block is the first resolution, and syntax elements corresponding to other video blocks in the plurality of video blocks than the target video block indicating that resolutions used to decode the other video blocks are the second resolutions; and decoding the piece of to-be-decoded data by using a resolution indicated by the syntax element corresponding to the piece of to-be-decoded data.

In some embodiments, the decoding process may be performed according to, but not limited to, the video blocks obtained by dividing the current video frame.

In some embodiments, the resolution used in the decoding process may be indicated by, but not limited to, the syntax element provided in the to-be-decoded data.

In some embodiments, a resolution corresponding to each region may be added to the syntax element by, but not limited to, an encoder side and transmitted to a decoder side. A correspondence between a region and a resolution is indicated by using flag bit data in the syntax element, so that the decoder side decodes the region by using the resolution corresponding to the region.

In some embodiments, the syntax element used for indicating the resolution used in decoding each region may be a piece of data located at a fixed position of the current video frame. At the position, different data values represent different resolutions. The syntax element representing the resolution corresponding to the region may be added at this position.

In some embodiments, during the reconstruction of the video, at least one pair of decoding regions to be reconstructed is determined in the current video frame, where each pair of decoding regions in the at least one pair of decoding regions includes a first decoding region using a resolution A and a second decoding region using a resolution B. and the first decoding region and the second decoding region are decoding regions with adjacent positions;

the resolution A of the first decoding region is adjusted to a target resolution, and the resolution B of the second decoding region is adjusted to the target resolution;

a first edge pixel set is determined in the first decoding region, and a second edge pixel set is determined in the second decoding region, where a position of the first edge pixel set is adjacent to a position of the second edge pixel set;

the first edge pixel set is filtered to obtain the filtered first edge pixel set, and the second edge pixel set is filtered to obtain the filtered second edge pixel set, where the filtered first edge pixel set matches the filtered second edge pixel set.

A first difference between a pixel value of an $i^{th}$ pixel in the filtered first edge pixel set and a pixel value of a $j^{th}$ pixel corresponding to the $i^{th}$ pixel in the filtered second edge pixel set is less than a second difference between a pixel value of an $i^{th}$ pixel in the first edge pixel set and a pixel value of a $j^{th}$ pixel in the second edge pixel set, where i is a positive integer and is less than or equal to a total number of pixels in the first edge pixel set, and j is a positive integer and is less than or equal to a total number of pixels in the second edge pixel set.

The adjustment to the target resolution includes:
1) When the target resolution is equal to the resolution A, the resolution B is adjusted to the resolution A.
2) When the target resolution is equal to the resolution B, the resolution A is adjusted to the resolution B.
3) When the target resolution is equal to a resolution C, the resolution A is adjusted to the resolution C, and the resolution B is adjusted to the resolution C, where the resolution C is different from the resolution A and different from the resolution B.

Edge filtering can be performed only after the resolutions are unified. The resolution adjustment is performed on the foregoing decoding regions, and the edge filtering processing is performed on the edge pixel sets determined in the decoding regions, to avoid obvious seams in the video during the reconstruction, thereby ensuring accurate restoration of content in the video, and further resolving the technical problem of video distortion caused by inconsistent resolutions.

Figure 5:
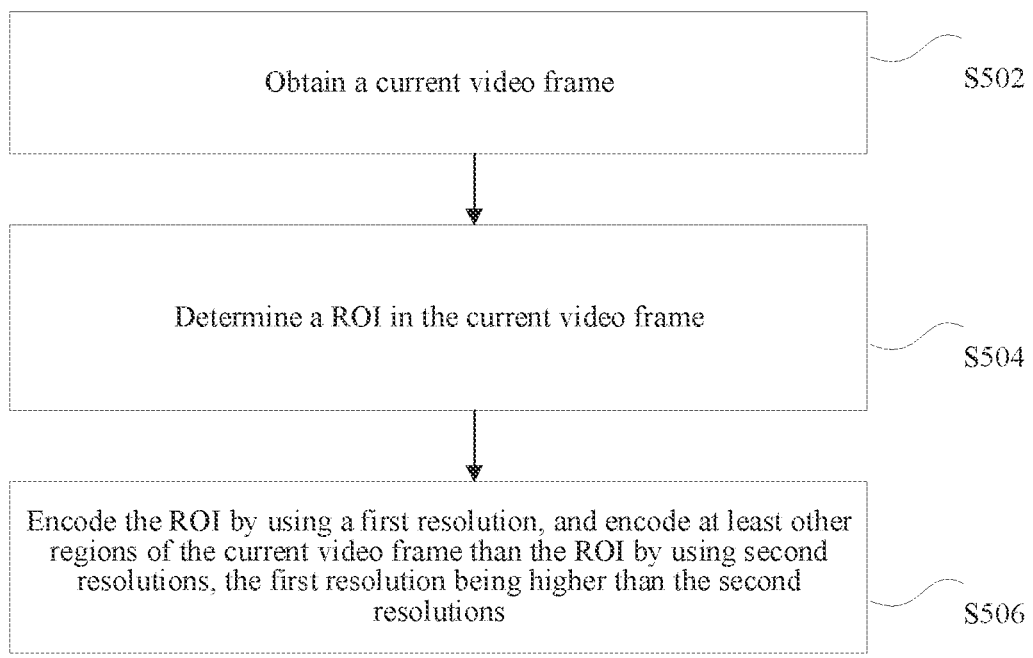
FIG. 5 is a schematic diagram of an exemplary video decoding method according to an embodiment of this application.

According to an aspect of the embodiments of this application, a video encoding method is provided. As shown in FIG. 5, the method includes:

S502. Obtain a current video frame to be encoded.
S504. Determine a ROI in the current video frame.
S506. Encode the ROI by using a first resolution, and encode at least other regions of the current video frame than the ROI by using second resolutions, the first resolution being higher than the second resolutions. In some embodiments, the first resolution and the second resolutions are determined according to a transmission bandwidth of a video stream including the current video frame from a source (e.g., a client terminal 604) to a destination (e.g., a video server 602), e.g., by comparing the transmission bandwidth with a preset bandwidth threshold.

Figure 6:
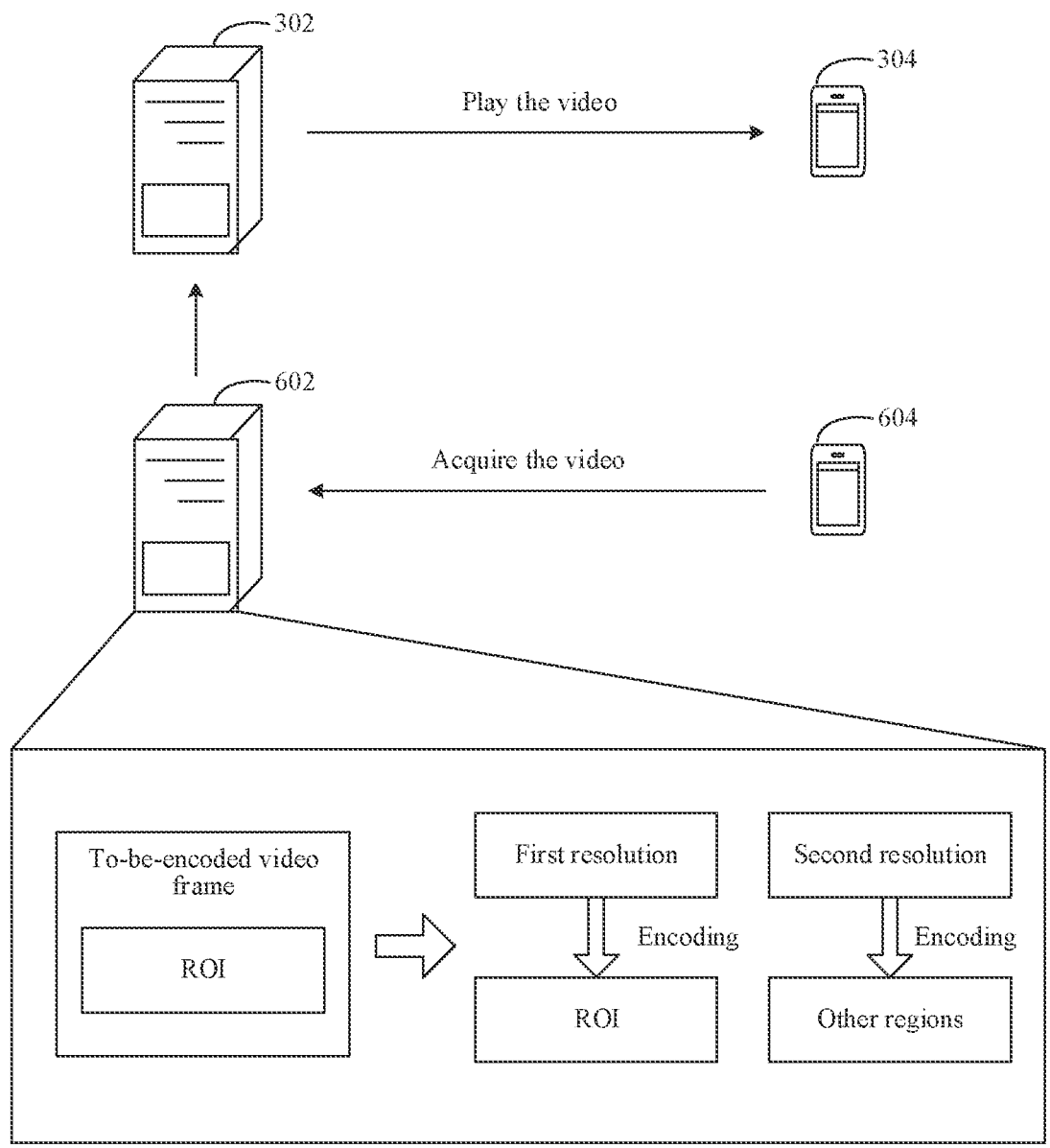
FIG. 6 is a schematic diagram of an application environment of an exemplary video decoding method according to an embodiment of this application.

In some embodiments, the video encoding method may be applied to a hardware environment including a server 602, a server 302, a client 604, and a client 304 shown in FIG. 6. As shown in FIG. 6, the server 602 obtains a current video frame acquired by the client 604; determines a ROI in the current video frame; and encodes the ROI by using the first resolution, and encodes at least other regions of the current video frame than the ROI by using the second resolutions, the first resolution being higher than the second resolutions. The server 602 sends the encoded video to the server 302 for decoding. The server 302 sends the decoded video to the client 304 for playing.

In some embodiments, the video encoding method may be applied to, but not limited to, a scenario of audio and video processing. For example, a client A and a client B make a video call. The client A and the client B separately acquire video images, encode the acquired video images, and send the encoded video to the other party. The other party decodes the received video and plays the decoded video.

In some embodiments, the video encoding method may be further applied to, but not limited to, scenarios such as the playback of video files and live video streaming.

The foregoing client may be, but is not limited to, various applications, for example, an on-line education application, an instant messaging application, a community space application, a game application, a shopping application, a browser application, a financial application, a multimedia application, and a live broadcast application. Specifically, the client may be applied to, but not limited to, a scenario in which audio and video are processed in the foregoing instant messaging application, or may be applied to, but not limited to, a scenario in which audio and video are processed in the foregoing multimedia application, to avoid large fluctuations in a PSNR of video encoding and decoding. This is merely an example and is not limited in this embodiment.

In some embodiments, different types of regions in the current video frame are encoded by using different resolutions. For example, the current video frame is divided into two types of regions, a region 1 being a ROI, and a region 2 being a non-ROI. The region 1 is encoded by using a relatively high resolution 1 and the region 2 is encoded by using a relatively low resolution 2.

In some embodiments, the current video frame is divided into a set of video blocks, a video block falling in the ROI may be encoded by using one resolution, and a video block falling in the non-ROI may be encoded by using another resolution.

In some embodiments, in terms of the ROI, in machine vision and image processing, a region that needs to be processed and that is outlined in a box, a circle, an ellipse, an irregular polygon, or the like from a processed image is referred to as the ROI. Various operators and functions may be used on machine vision software such as Halcon, OpenCV, and MATLAB to obtain the ROI.

In the field of image processing, a ROI is an image region selected from an image, and this region is the focus of image analysis. The region is delineated for further processing. The ROI is used to delineate a target expected to be read, which can reduce processing time and increase accuracy.

As can be seen, through the foregoing steps, different blocks in a frame of a video are adaptively encoded by using corresponding resolutions. In this way, regardless whether a transmission bandwidth is relatively small or whether the transmission bandwidth is relatively large, the corresponding PSNR is relatively large, and the distortion is relatively small, thereby ensuring that the PSNR can change within a small range. In addition, the PSNR is relatively large, thereby achieving a technical effect of avoiding large fluctuations in the PSNR of video encoding and decoding, and further resolving the technical problem of large fluctuations in the PSNR due to the use of the same resolution for video encoding and decoding in the related art.

In an implementation, the encoding the ROI by using a first resolution, and encoding at least other regions of the current video frame than the ROI by using second resolutions includes:
dividing the current video frame into a plurality of video blocks; and
encoding a target video block that has an overlapping part with the ROI among the plurality of video blocks by using the first resolution, and encoding other video blocks in the plurality of video blocks than the target video block by using the second resolutions.

In some embodiments, the current video frame is divided into video blocks. The target video block that overlaps the ROI is encoded by using the first resolution, and the other video blocks are encoded by using the second resolutions. In other words, as long as a video block has a part that falls in the ROI, the video block is encoded by using the higher first resolution.

In an implementation, the encoding other video blocks in the plurality of video blocks than the target video block by using the second resolutions includes:

encoding the other video blocks in the plurality of video blocks than the target video block by using a plurality of resolutions, the second resolutions including the plurality of resolutions.

In some embodiments, resolutions used when video blocks in the non-ROI are encoded may be the same or different. When different resolutions are used for encoding, the resolutions used may be determined according to distances between the video blocks and the center of the ROI. For example, a smaller resolution is used for a longer distance, and a high resolution is used for a shorter distance.

In an implementation, after the encoding a target video block that has an overlapping part with the ROI among the plurality of video blocks by using the first resolution, and encoding other video blocks in the plurality of video blocks than the target video block by using the second resolutions, the method further includes:

adding a first syntax element to first encoded data corresponding to the target video block, and adding second syntax elements to second encoded data corresponding to the other video blocks, the first encoded data being data obtained by encoding the target video block by using the first resolution, the second encoded data being data obtained by encoding the other video blocks by using the second resolutions, the first syntax element being used for indicating the first resolution, and the second syntax elements being used for indicating the second resolutions.

In some embodiments, a resolution used in encoding each video block may be indicated by adding flag bit data.

In some embodiments, the syntax element used for indicating the resolution used in encoding each video block may be a piece of data located at a fixed position of the current video frame. At the position, different data values represent different resolutions. The syntax element representing the resolution corresponding to the region may be added at this position.

For ease of description, the foregoing method embodiments are stated as a series of action combinations. However, a person skilled in the art is to learn that this application is not limited to the described sequence of the actions because according to this application, some steps may be performed in another sequence or may be simultaneously performed. In addition, a person skilled in the art is also to learn that the embodiments described in this specification are all exemplary embodiments, and the involved actions and modules are not necessarily required to this application.

Figure 7:
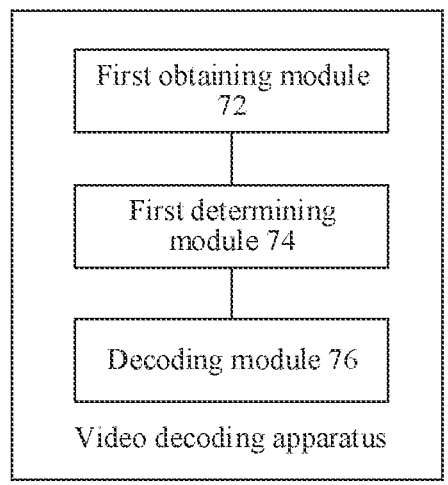
FIG. 7 is a schematic diagram of an exemplary video decoding apparatus according to an embodiment of this application.

According to another aspect of the embodiments of this application, a video decoding apparatus for implementing the foregoing video decoding method is further provided. As shown in FIG. 7, the apparatus includes:

a first obtaining module 72, configured to obtain a current video frame;

a first determining module 74, configured to determine a ROI of the current video frame; and a decoding module 76, configured to decode the ROI by using a first resolution, and decode at least other regions of the current video frame than the ROI by using second resolutions, the first resolution being higher than the second resolutions.

In some embodiments, the decoding module 76 includes:

a first decoding unit, configured to decode a target video block that has an overlapping part with the ROI among a plurality of video blocks by using the first resolution, and decode other video blocks in the plurality of video blocks than the target video block by using the second resolutions, the current video frame being divided into the plurality of video blocks.

In some embodiments, the first decoding unit is configured to:

decode the other video blocks in the plurality of video blocks than the target video block by using a plurality of resolutions, the second resolutions including the plurality of resolutions.

In some embodiments, the decoding module 76 includes:

an obtaining unit, configured to obtain a syntax element from each piece of to-be-decoded data in to-be-decoded data of a plurality of video blocks, a syntax element corresponding to a target video block in the plurality of video blocks that has an overlapping part with the ROI indicating that a resolution used to decode the target video block is the first resolution, and syntax elements corresponding to other video blocks in the plurality of video blocks than the target video block indicating that resolutions used to decode the other video blocks are the second resolutions; and a second decoding unit, configured to decode the piece of to-be-decoded data by using a resolution indicated by the syntax element corresponding to the piece of to-be-decoded data.

Figure 8:
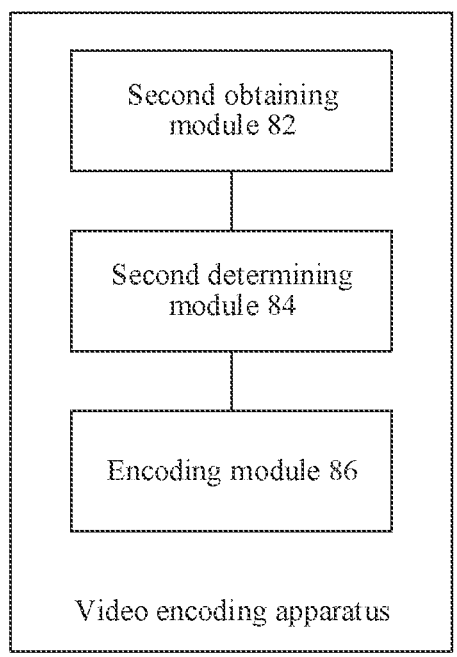
FIG. 8 is a schematic diagram of an exemplary video encoding apparatus according to an embodiment of this application.

According to another aspect of the embodiments of this application, a video encoding apparatus for implementing the foregoing video encoding method is further provided. As shown in FIG. 8, the apparatus includes:

a second obtaining module, 82 configured to obtain a current video frame;

a second determining module 84, configured to determine a ROI in the current video frame; and an encoding module 86, configured to encode the ROI by using a first resolution, and encode other regions of the current video frame than the ROI by using second resolutions, the first resolution being higher than the second resolutions.

In some embodiments, the encoding module 86 includes:

a division unit, configured to divide the current video frame into a plurality of video blocks; and a processing unit, configured to encode a target video block that has an overlapping part with the ROI among the plurality of video blocks by using the first resolution, and encode other video blocks in the plurality of video blocks than the target video block by using the second resolutions.

In some embodiments, the processing unit is configured to:

encode the other video blocks in the plurality of video blocks than the target video block by using a plurality of resolutions, the second resolutions including the plurality of resolutions.

In some embodiments, the apparatus further includes:

an addition module, configured to: after the target video block that has an overlapping part with the ROI among the plurality of video blocks is encoded by using the first resolution, and the other video blocks in the plurality of video blocks than the target video block are encoded by using the second resolutions, add a first syntax element to first encoded data corresponding to the target video block, and add second syntax elements to second encoded data corresponding to the other video blocks, the first encoded data being data obtained by encoding the target video block by using the first resolution, the second encoded data being data obtained by encoding the other video blocks by using the second resolutions, the first syntax element being used for indicating the first resolution, and the second syntax elements being used for indicating the second resolutions.

For an application environment of this embodiment of this application, reference may be made to, but is not limited to, the application environment of the foregoing embodiment, and details are not repeated in this embodiment. This embodiment of this application provides a specific application example for implementing the foregoing video encoding method. In this application, the term "unit" or "module" refers to a computer program or part of the computer program that has a predefined function and works together with other related parts to achieve a predefined goal and may be all or partially implemented by using software, hardware (e.g., processing circuitry and/or memory configured to perform the predefined functions), or a combination thereof. Each unit or module can be implemented using one or more processors (or processors and memory). Likewise, a processor (or processors and memory) can be used to implement one or more modules or units. Moreover, each module or unit can be part of an overall module that includes the functionalities of the module or unit.

Figure 9:
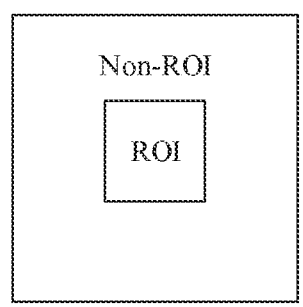
FIG. 9 is a schematic diagram of an application scenario of an exemplary video codec method according to an embodiment of this application.

In an embodiment, the foregoing video encoding and decoding methods may be applied to, but not limited to, a scenario of video encoding and decoding processing as shown in FIG. 9. In this scenario, for a tth frame to be encoded in the video, the region in the tth frame is divided into a ROI and a non-ROI, as shown in FIG. 9. In an exemplary manner, the ROI may be located in the middle region of the frame and be square or rectangular. However, this is only an example, and this application is not limited thereto. The ROI may be alternatively located in another position and have another shape. For example, the ROI and the non-ROI may be determined according to content of a picture in the frame, and the position and the shape of the ROI correspond to a target human face in the picture.

A high resolution is selected for blocks in the ROI, and a low resolution is selected for blocks in the non-ROI. In an example, the blocks in the ROI are encoded by using the same resolution (for example, a resolution 1), and the blocks in the non-ROI are encoded by using the same resolution (for example, a resolution 2), where the resolution 1 is higher than the resolution 2.

In an example, the resolution 1 and the resolution 2 are both selected from a predetermined set of resolutions.

Figure 10:
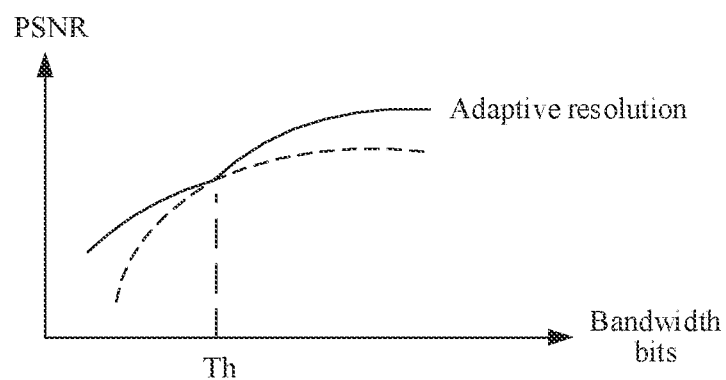
FIG. 10 is a schematic diagram of an application scenario of another exemplary video codec method according to an embodiment of this application.

As shown in FIG. 10, in the video encoding process of this application, different blocks in a frame of a video are adaptively encoded by using corresponding resolutions, so that regardless of whether a transmission bandwidth is relatively small (for example, less than a bandwidth threshold Th shown in FIG. 10), or whether the transmission bandwidth is relatively large (for example, larger than the bandwidth threshold Th shown in FIG. 10), corresponding PSNRs are relatively large, and distortion is relatively small.

Figure 1:
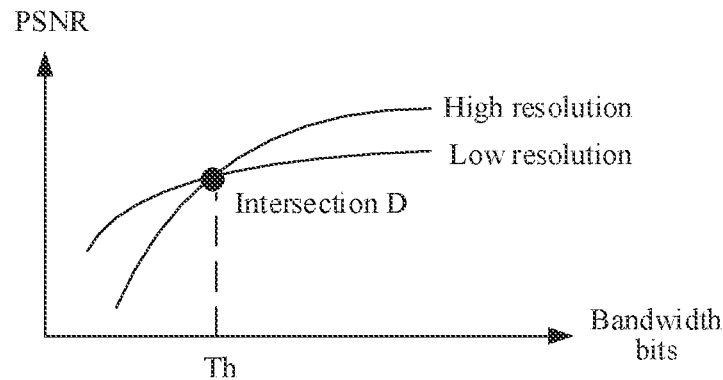
FIG. 1 is a schematic diagram of a PSNR of a codec manner in the related art.

In addition, because different blocks in a frame of a video are adaptively encoded by using corresponding resolutions, there is no need to select the corresponding resolutions according to an intersection (for example, an intersection in FIG. 1) corresponding to different types of videos or different frames of the same video or different blocks in the same frame during encoding of frames in the video, which reduces encoding complexity.

Figure 11:
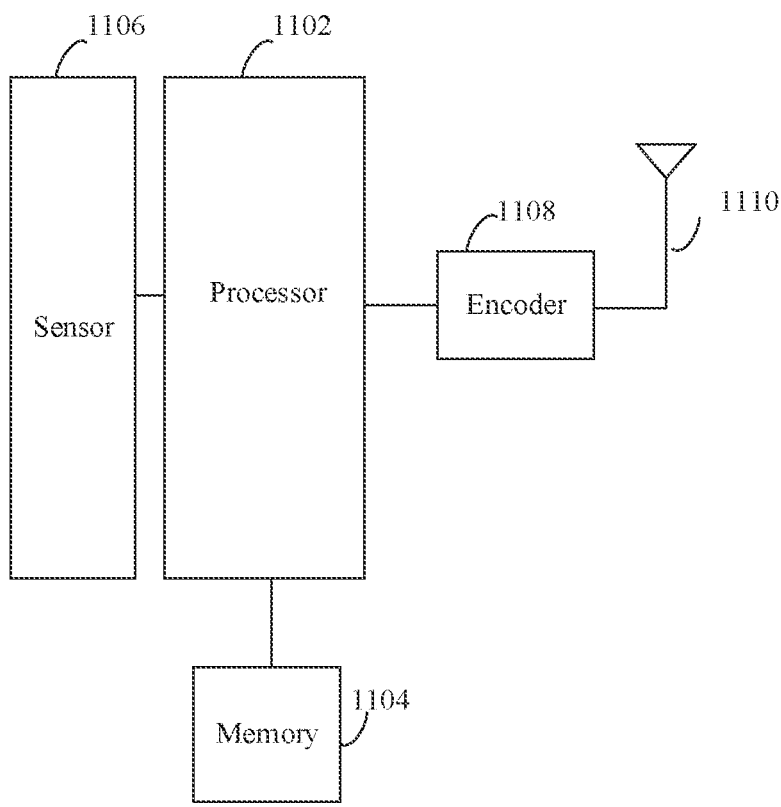
FIG. 11 is a schematic diagram of an electronic device according to an embodiment of this application.

According to still another aspect of the embodiments of this application, an electronic device configured to implement the foregoing video decoding method or video encoding method is further provided. As shown in FIG. 11, the electronic device includes: one or more (only one is shown in the figure) processors 1102, a memory 1104, a sensor 1106, an encoder 1108, and a transmission apparatus 1110. The memory stores computer-readable instructions, and the processor is configured to perform the steps in any one of the foregoing method embodiments through the computer-readable instructions.

In some embodiments, the electronic device may be located in at least one of a plurality of network devices of a computer network.

In some embodiments, the foregoing processor may be configured to perform the following steps through the computer-readable instructions:

obtaining a current video frame;
determining a ROI of the current video frame; and
decoding the ROI by using a first resolution, and decoding at least other regions of the current video frame than the ROI by using second resolutions, the first resolution being higher than the second resolutions.

In some embodiments, the foregoing processor may be further configured to perform the following steps through the computer-readable instructions:

obtaining a current video frame;
determining a ROI in the current video frame; and
encoding the ROI by using a first resolution, and encoding at least other regions of the current video frame than the ROI by using second resolutions, the first resolution being higher than the second resolutions.

In some embodiments, a person of ordinary skill in the art may understand that, the structure shown in FIG. 11 is only illustrative. The electronic device may be alternatively a terminal device such as a smartphone (for example, an Android mobile phone or an iOS mobile phone), a tablet computer, a palmtop computer, a mobile Internet device (MID), or a PAD. FIG. 11 does not constitute a limitation on the structure of the electronic device. For example, the electronic device may alternatively include more or fewer components (such as a network interface and a display device) than those shown in FIG. 11, or have a configuration different from that shown in FIG. 11.

The memory 1104 may be configured to store computer-readable instructions and modules, for example, computer-readable instructions/modules corresponding to the video decoding or encoding method and apparatuses in the embodiments of this application. The processor 1102 runs the computer-readable instructions and modules stored in the memory 1104 to perform various functional applications and data processing, that is, implement the foregoing video decoding or encoding method. The memory 1104 may include a high-speed random memory, and may also include a non-volatile memory, for example, one or more magnetic storage apparatuses, a flash memory, or another non-volatile solid-state memory. In some embodiments, the memory 1104 may further include memories remotely disposed relative to the processor 1102, and the remote memories may be connected to a terminal by using a network. Examples of the network include, but are not limited to, the Internet, an intranet, a local area network, a mobile communication network, and a combination thereof.

The transmission apparatus 1110 is configured to receive or transmit data by using a network. Specific examples of the foregoing network may include a wired network and a wireless network. In an example, the transmission apparatus 1110 includes a network interface controller (NIC). The NIC may be connected to another network device and a router by using a network cable, to communicate with the Internet or a local area network. In an example, the transmission apparatus 1110 is a radio frequency (RF) module, which communicates with the Internet in a wireless manner.

Specifically, the memory 1104 is configured to store an application.

An embodiment of this application further provides a storage medium, storing computer-readable instructions, the computer-readable instructions being configured to perform the steps in any one of the foregoing method embodiments when being run.

In some embodiments, the storage medium may be configured to store computer-readable instructions for performing the following steps:

obtaining a current video frame;

determining a ROI of the current video frame; and decoding the ROI by using a first resolution, and decoding at least other regions of the current video frame than the ROI by using second resolutions, the first resolution being higher than the second resolutions.

In some embodiments, the storage medium may be further configured to store computer-readable instructions for performing the following steps:

obtaining a current video frame;

determining a ROI in the current video frame; and encoding the ROI by using a first resolution, and encoding at least other regions of the current video frame than the ROI by using second resolutions, the first resolution being higher than the second resolutions.

In some embodiments, the storage medium is further configured to store computer-readable instructions for performing the steps included in the methods according to the foregoing embodiments, and details are not repeated in this embodiment.

In some embodiments, a person of ordinary skill in the art can understand that all or some of the steps of the methods in the foregoing embodiments can be implemented by computer-readable instructions instructing relevant hardware of a terminal device. The computer-readable instructions may be stored in a computer-readable storage medium, and the storage medium may include a flash drive, a read-only memory (ROM), a random access memory (RAM), a magnetic disk, a compact disc, and the like.

The sequence numbers of the foregoing embodiments of this application are merely for description purpose, and are not intended to indicate priorities of the embodiments.

When the integrated unit in the foregoing embodiments is implemented in a form of a software functional unit and sold or used as an independent product, the integrated unit may be stored in the foregoing computer-readable storage medium. Based on such an understanding, the technical solutions of this application essentially, or a part contributing to the related art, or all or a part of the technical solutions may be implemented in a form of a software product. The computer software product is stored in a storage medium and includes several computer-readable instructions for instructing one or more computer devices (which may be a personal computer, a server, a network device, or the like) to perform all or some of the steps of the methods in the embodiments of this application.

In the foregoing embodiments of this application, the descriptions of the embodiments have respective focuses. For a part that is not described in detail in an embodiment, reference may be made to related descriptions in other embodiments.

In the several embodiments provided in this application, it is to be understood that, the disclosed client may be implemented in another manner. The apparatus embodiments described above are merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the units or modules may be implemented in electrical or other forms.

The units described as separate components may or may not be physically separated, and the components displayed as units may or may not be physical units, and may be located in one place or may be distributed on a plurality of network units. Some or all of the units may be selected according to actual requirements to achieve the objectives of the solutions of the embodiments.

In addition, functional units in the embodiments of this application may be integrated into one processing unit, or each of the units may exist alone physically, or two or more units may be integrated into one unit. The integrated unit may be implemented in a form of hardware, or may be implemented in a form of a software functional unit.

The foregoing descriptions are merely exemplary implementations of this application. A person of ordinary skill in the art may further make several improvements and modifications without departing from the principle of this application, and the improvements and modifications are also considered as falling within the protection scope of this application.

What is claimed is:

1. A video decoding method performed by an electronic device, the method comprising:

obtaining a current video frame;

determining a region of interest (ROI) of the current video frame;

decoding the ROI by using a first resolution, and decoding at least other regions of the current video frame than the ROI by using a plurality of second resolutions, the first resolution being higher than the plurality of second resolutions, wherein the first resolution and the plurality of second resolutions are determined according to a comparison of a current transmission bandwidth of a video stream to a preset bandwidth threshold, the video stream including the current video frame; and matching pixel sets at a boundary between a pair of a first decoding region a and a second decoding region among the at least other regions by applying edge filtering, wherein the first decoding region and the second decoding region are decoding regions with adjacent positions, including:

determining, among the plurality of second resolutions, a resolution A for the first decoding region and a resolution B for the second decoding region, wherein the resolution A is different from the resolution B;

identifying a target resolution for the first decoding region and the second decoding region, wherein the target resolution is different from the resolution A and the resolution B;

identifying a first edge pixel set in the first decoding region;

identifying a second edge pixel set, distinct from the first edge pixel set, in the second decoding region, wherein the second edge pixel set is adjacent to the first edge pixel set; and filtering the first edge pixel set and the second edge pixel set according to the target resolution.

2. The method according to claim 1, wherein the decoding the ROI by using a first resolution, and decoding at least other regions of the current video frame than the ROI by using second resolutions comprises:

decoding a target video block that has an overlapping part with the ROI among a plurality of video blocks by using the first resolution, and decoding other video blocks in the plurality of video blocks than the target video block by using the second resolutions, the current video frame being divided into the plurality of video blocks.

3. The method according to claim 2, wherein the decoding other video blocks in the plurality of video blocks than the target video block by using the second resolutions comprises:

decoding the other video blocks in the plurality of video blocks than the target video block by using a plurality of resolutions, the second resolutions comprising the plurality of resolutions.

4. The method according to claim 1, wherein the decoding the ROI by using a first resolution, and decoding at least other regions of the current video frame than the ROI by using second resolutions comprises:

obtaining a syntax element from each piece of to-be-decoded data in to-be-decoded data of a plurality of video blocks, a syntax element corresponding to a target video block in the plurality of video blocks that has an overlapping part with the ROI indicating that a resolution used to decode the target video block is the first resolution, and syntax elements corresponding to other video blocks in the plurality of video blocks than the target video block indicating that resolutions used to decode the other video blocks are the second resolutions; and decoding the piece of to-be-decoded data by using a resolution indicated by the syntax element corresponding to the piece of to-be-decoded data.

5. The method according to claim 1, wherein the determining a ROI of the current video frame comprises:

determining a region at a center of the current video frame as the ROI; or determining a person region or a thing region in the current video frame as the ROI; or determining a picture region in which motion exists in the current video frame as the ROI.

6. A video encoding method performed by an electronic device, the method comprising:

obtaining a second current video frame;

determining a region of interest (ROI) in the second current video frame;

encoding the ROI by using a first resolution, and encoding at least other regions of the second current video frame than the ROI by using a plurality of second resolutions, the first resolution being higher than the plurality of second resolutions, wherein the first resolution and the plurality of second resolutions are determined according to a comparison of a current transmission bandwidth of a video stream to a preset bandwidth threshold, the video stream including the second current video frame; and matching pixel sets at a boundary between a pair of a first decoding region a and a second decoding region among the at least other regions by applying edge filtering, wherein the first decoding region and the second decoding region are decoding regions with adjacent positions, including:

determining, among the plurality of second resolutions, a resolution A for the first decoding region and a resolution B for the second decoding region, wherein the resolution A is different from the resolution B;

identifying a target resolution for the first decoding region and the second decoding region, wherein the target resolution is different from the resolution A and the resolution B;

identifying a first edge pixel set in the first decoding region;

identifying a second edge pixel set, distinct from the first edge pixel set, in the second decoding region, wherein the second edge pixel set is adjacent to the first edge pixel set; and filtering the first edge pixel set and the second edge pixel set according to the target resolution.

7. The method according to claim 6, wherein the encoding the ROI by using a first resolution, and encoding at least other regions of the second current video frame than the ROI by using second resolutions comprises:

dividing the second current video frame into a plurality of video blocks; and encoding a target video block that has an overlapping part with the ROI among the plurality of video blocks by using the first resolution, and encoding other video blocks in the plurality of video blocks than the target video block by using the second resolutions.

8. The method according to claim 7, wherein the encoding other video blocks in the plurality of video blocks than the target video block by using the second resolutions comprises:

encoding the other video blocks in the plurality of video blocks than the target video block by using a plurality of resolutions, the second resolutions comprising the plurality of resolutions.

9. The method according to claim 7, wherein after the encoding a target video block that has an overlapping part with the ROI among the plurality of video blocks by using the first resolution, and encoding other video blocks in the plurality of video blocks than the target video block by using the second resolutions, the method further comprises:

adding a first syntax element to first encoded data corresponding to the target video block, and adding second syntax elements to second encoded data corresponding to the other video blocks, the first encoded data being data obtained by encoding the target video block by using the first resolution, the second encoded data being data obtained by encoding the other video blocks by using the second resolutions, the first syntax element being used for indicating the first resolution, and the second syntax elements being used for indicating the second resolutions.

10. An electronic device, comprising a memory and one or more processors, the memory storing computer-readable instructions, and the computer-readable instructions, when executed by the one or more processors, cause the electronic device to perform a plurality of operations including:

obtaining a current video frame;

determining a region of interest (ROI) of the current video frame;

decoding the ROI by using a first resolution, and decoding at least other regions of the current video frame than the ROI by using a plurality of second resolutions, the first resolution being higher than the plurality of second resolutions, wherein the first resolution and the plurality of second resolutions are determined according to a comparison of a current transmission bandwidth of a video stream to a preset bandwidth threshold, the video stream including the current video frame from a source to the electronic device; and matching pixel sets at a boundary between a pair of a first decoding region a and a second decoding region among the at least other regions by applying edge filtering, wherein the first decoding region and the second decoding region are decoding regions with adjacent positions, including:

determining, among the plurality of second resolutions, a resolution A for the first decoding region and a resolution B for the second decoding region, wherein the resolution A is different from the resolution B;

identifying a target resolution for the first decoding region and the second decoding region, wherein the target resolution is different from the resolution A and the resolution B;

identifying a first edge pixel set in the first decoding region;

identifying a second edge pixel set, distinct from the first edge pixel set, in the second decoding region, wherein the second edge pixel set is adjacent to the first edge pixel set; and filtering the first edge pixel set and the second edge pixel set according to the target resolution.

11. The electronic device according to claim 10, wherein the decoding the ROI by using a first resolution, and decoding at least other regions of the current video frame than the ROI by using second resolutions comprises:

decoding a target video block that has an overlapping part with the ROI among a plurality of video blocks by using the first resolution, and decoding other video blocks in the plurality of video blocks than the target video block by using the second resolutions, the current video frame being divided into the plurality of video blocks.

12. The electronic device according to claim 11, wherein the decoding other video blocks in the plurality of video blocks than the target video block by using the second resolutions comprises:

decoding the other video blocks in the plurality of video blocks than the target video block by using a plurality of resolutions, the second resolutions comprising the plurality of resolutions.

13. The electronic device according to claim 10, wherein the decoding the ROI by using a first resolution, and decoding at least other regions of the current video frame than the ROI by using second resolutions comprises:

obtaining a syntax element from each piece of to-be-decoded data in to-be-decoded data of a plurality of video blocks, a syntax element corresponding to a target video block in the plurality of video blocks that has an overlapping part with the ROI indicating that a resolution used to decode the target video block is the first resolution, and syntax elements corresponding to other video blocks in the plurality of video blocks than the target video block indicating that resolutions used to decode the other video blocks are the second resolutions; and decoding the piece of to-be-decoded data by using a resolution indicated by the syntax element corresponding to the piece of to-be-decoded data.

14. The electronic device according to claim 10, wherein the determining a ROI of the current video frame comprises:

determining a picture region in which motion exists in the current video frame as the ROI.

15. The electronic device according to claim 10, wherein the plurality of operations further comprise:

obtaining a second current video frame;

determining a second region of interest (ROI) in the second current video frame; and encoding the second ROI by using a first resolution, and encoding at least other regions of the second current video frame than the second ROI by using second resolutions, the first resolution being higher than the second resolutions.

16. The electronic device according to claim 15, wherein the encoding the second ROI by using a first resolution, and encoding at least other regions of the second current video frame than the second ROI by using second resolutions comprises:

dividing the second current video frame into a plurality of video blocks; and encoding a target video block that has an overlapping part with the second ROI among the plurality of video blocks by using the first resolution, and encoding other video blocks in the plurality of video blocks than the target video block by using the second resolutions.

17. The electronic device according to claim 16, wherein the encoding other video blocks in the plurality of video blocks than the target video block by using the second resolutions comprises:

encoding the other video blocks in the plurality of video blocks than the target video block by using a plurality of resolutions, the second resolutions comprising the plurality of resolutions.

18. The electronic device according to claim 10, wherein the determining a ROI of the current video frame comprises identifying a region of focus for image analysis.

19. The method according to claim 1, wherein the first resolution and the second resolutions are determined to reduce fluctuation in a peak signal-to-noise ratio (PSNR) of the current video frame.

20. The electronic device according to claim 10, wherein the first resolution and the second resolutions are determined to reduce fluctuation in a peak signal-to-noise ratio (PSNR) of the current video frame.

* * * * *